UNITED STATES PATENT OFFICE.

GUSTAVUS MICHAELIS, OF ALBANY, NEW YORK.

PAINT-REMOVER.

No. 812,582.　　　Specification of Letters Patent.　　　Patented Feb. 13, 1906.

Application filed April 28, 1905. Serial No. 257,920.

*To all whom it may concern:*

Be it known that I, GUSTAVUS MICHAELIS, a citizen of the United States of America, and a resident of the city and county of Albany, State of New York, have invented certain new and useful Improvements in Paint-Removers, of which the following is a specification.

My invention relates to a composition for the removal of paint and varnish; and the object of my invention is to provide a chemical composition which when applied to paint and varnish will remove the same and leave the surface of the wood or other substance from which the paint or varnish has been removed in condition for receiving a new coat of paint. I accomplish this object in the manner set forth in the following specification.

I prepare a mixture having as dissolving agents benzin or benzol or any other suitable hydrocarbon and an alcohol, either ordinary grain or wood alcohol, or a mixture of each or similar alcohols, with or without acetone or other similar liquids, which are capable of dissolving paint, varnish, &c., preferably after the alcohol has been freed from water, and to this mixture I add from one to five per cent. of ordinary dried water and alcohol soluble soap, which I dissolve therein with the aid of heat. Upon cooling, the mixture is ready for use.

As my composition contains no fats or any other solid material which is not soluble in water, it is evident that after the removal of the paint and varnish, &c., and the evaporation of the solvents the surface from which the paint or varnish has been removed may be readily cleaned with soap and water or with a moist cloth and be in condition for receiving a new coat of paint or other finish. This result is not attained when wax or paraffin or similar products are used, because they leave the surface covered with a waxy substance which is not soluble in water and is difficult to remove after the paint or varnish has disappeared.

What I claim as my invention, and desire to secure by Letters Patent, is—

1. A composition for removing varnish and paint, comprising benzol; a monohydric alcohol; and a water and alcohol soluble soap dissolved with the aid of heat, substantially as described.

2. A composition for removing paint and varnish having for dissolving agents a hydrocarbon and a monohydric alcohol, with a water and alcohol soluble soap dissolved therein, substantially as described.

3. A composition for removing paint and varnish, consisting of a hydrocarbon and an alcohol, of at least 97° strength; and a water and alcohol soluble soap dissolved therein with the aid of heat, substantially as described.

4. A composition for removing paint and varnish, consisting of a water and alcohol soluble soap; and dissolving agents, consisting of a hydrocarbon and ordinary alcohol of at least 97° strength, substantially as described.

Signed at Albany, New York, this 24th day of April, 1905.

GUSTAVUS MICHAELIS.

Witnesses:
　D. C. DE FOREST,
　LOTTIE PRIOR.